United States Patent
Priesgen et al.

[19]

[11] Patent Number: 5,823,559
[45] Date of Patent: Oct. 20, 1998

[54] TRAILER

[75] Inventors: Tony P. Priesgen, Hartford; Gary L. Youmans, West Bend, both of Wis.

[73] Assignee: Triton Corporation, Hartford, Wis.

[21] Appl. No.: 715,698

[22] Filed: Sep. 19, 1996

[51] Int. Cl.$^6$ .......................................... B60P 3/10
[52] U.S. Cl. ................................................ 280/414.1
[58] Field of Search ....................... 280/414.1, 414.2, 280/414.3, 638, 656; 414/534

[56] References Cited

U.S. PATENT DOCUMENTS

| | | | |
|---|---|---|---|
| 3,058,756 | 10/1962 | Holsclaw | 280/414.1 |
| 3,067,892 | 12/1962 | Barrett et al. | 280/414.1 |
| 3,091,352 | 5/1963 | Vitable | 280/414.1 |
| 3,160,297 | 12/1964 | Stumvoll | 280/414.1 |
| 3,239,081 | 3/1966 | Poleschuk | 280/414.1 |
| 3,303,951 | 2/1967 | Baldwin | 280/414.1 |
| 3,438,524 | 4/1969 | Snodgrass | 280/414.1 |
| 3,524,659 | 8/1970 | Filter | 280/414.1 |
| 3,750,805 | 8/1973 | Finney | 280/414.1 |
| 3,762,583 | 10/1973 | Steves | 280/414.1 |
| 3,797,681 | 3/1974 | Brettrager | 280/414.1 |
| 4,092,755 | 6/1978 | Hughes | 280/414.1 |
| 4,232,990 | 11/1980 | Pierce | 280/414.1 |
| 4,331,346 | 5/1982 | Walters | 280/414.1 |
| 4,623,161 | 11/1986 | Sprague | 280/414.1 |
| 4,664,401 | 5/1987 | Carrick | 280/414.1 |
| 4,697,976 | 10/1987 | Godbersen | 280/414.1 |
| 4,717,165 | 1/1988 | Johnson | 280/414.1 |
| 4,779,888 | 10/1988 | Raymond | 280/414.1 |
| 4,802,685 | 2/1989 | Godbersen | 280/414.1 |
| 4,986,571 | 1/1991 | Godbersen | 280/414.1 |
| 5,064,336 | 11/1991 | Godbersen | 280/414.1 |
| 5,069,595 | 12/1991 | Smith et al. | 280/414.1 |
| 5,114,168 | 5/1992 | Kehl | 280/414.1 |
| 5,133,570 | 7/1992 | Godbersen | 280/414.1 |
| 5,172,928 | 12/1992 | Capps | 280/414.1 |
| 5,176,394 | 1/1993 | Veazey | 280/414.1 |
| 5,273,391 | 12/1993 | White | 280/414.1 |
| 5,292,145 | 3/1994 | Ostrand | 280/414.1 |
| 5,393,083 | 2/1995 | Mally | 280/414.1 |
| 5,417,447 | 5/1995 | Godbersen | 280/414.1 |
| 5,518,261 | 5/1996 | Godbersen | 280/414.1 |

*Primary Examiner*—Kevin Hurley
*Attorney, Agent, or Firm*—Andrus, Sceales, Starke & Sawall

[57] ABSTRACT

A trailer is provided which accommodates a plurality of various sized watercraft thereon. The trailer includes a bow stop assembly slidably mounted to the frame structure of the trailer. Similarly, bunk elements are provided which are slidably mounted to the frame structure so as to allow the bunk elements to slide transverse to the longitudinal axis of the trailer.

43 Claims, 2 Drawing Sheets

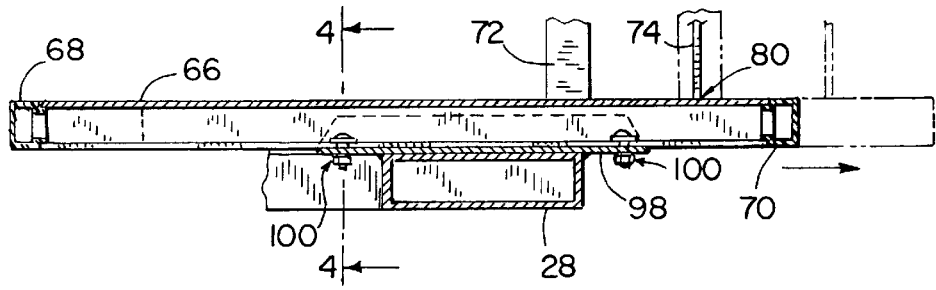
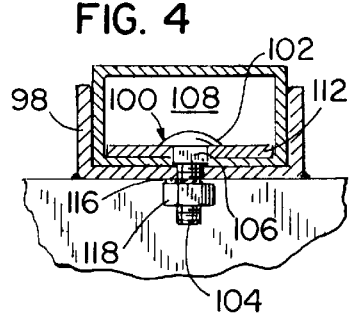
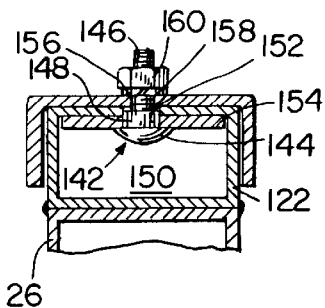
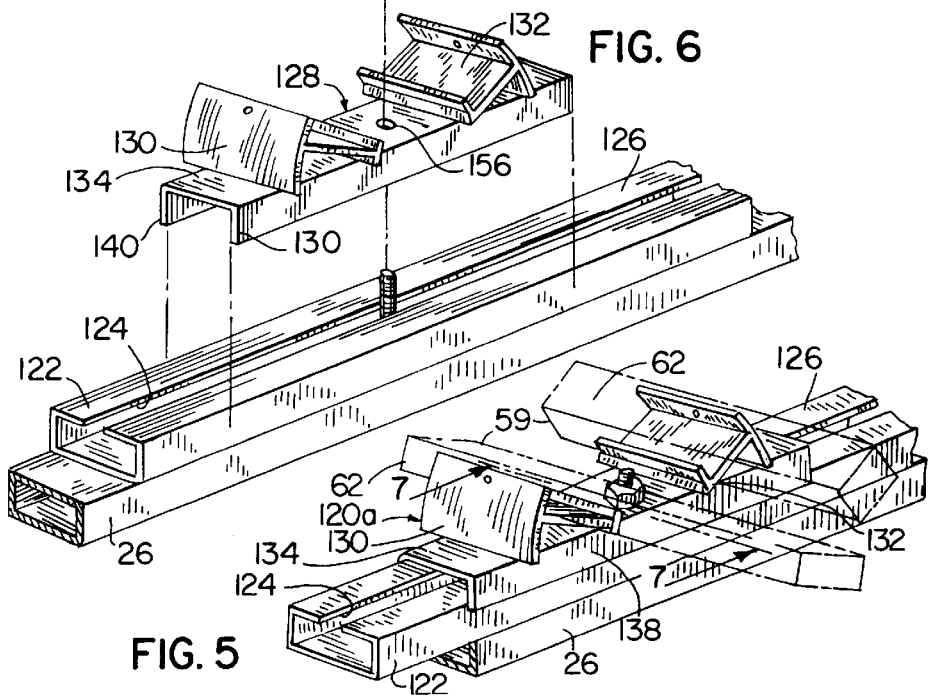

TRAILER

BACKGROUND OF THE INVENTION

This invention relates to trailers, and in particular, to a trailer which accommodates a plurality of various sized watercraft thereon.

In recent years, boat manufacturers have introduced a plurality of new watercraft in order to attract new customers. These new types of watercraft come in a variety of styles and sizes to satisfy the needs of those potential customers. Along with the increase in the number of styles and sizes of watercraft, comes a corresponding need to provide a watercraft trailer which can accommodate the various styles and sizes of watercraft now available.

Heretofore, trailers which have been designed to accommodate various styles and sizes of watercraft have been unsatisfactory. Cumbersome and time consuming mechanisms have been used for repositioning elements of the trailer such as the bow stop and the bunk elements. For example, in the Godbersen U.S. Pat. No. 5,417,447, the bow stop is mounted to the trailer frame by a first and second U-bolts. Hence, in order to adjust the location of the bow stop, both U-bolts must be loosened to allow the bow stop to be repositioned. Thereafter, the U-bolts must be retightened in their desired locale, a cumbersome and tedious process. Further, in most watercraft trailers, the position of the pair of bunk elements on the trailer may not be adjusted to accommodate different types of watercraft, or if adjustable, only through similar repositioning of U-bolts as with the repositioning of the bow stop.

Therefore, it is the primary object and feature of the present invention to provide a watercraft trailer which accommodates various styles and sizes of watercraft.

It is a further object and feature of the present invention to provide a watercraft trailer which provides a bow stop and bunk elements which are easily repositionable to accommodate watercraft of different styles and sizes.

It is a still further object and feature of the present invention to provide a watercraft trailer which accommodates watercraft of different styles and sizes, but yet is simple to manufacture and to utilize.

In accordance with the present invention, a trailer is provided. The trailer comprises a frame structure extending along the longitudinal axis. The frame structure includes first and second side portions, and first and second frame members transverse to the longitudinal axis which interconnect the side portions. Each side portion has a first end which converges towards the first end of the other side portion.

The trailer further includes a wheel and axle assembly extending along a second axis transverse to the longitudinal axis, and mounted to each side portion of the frame structure. A channel member is also mounted to the frame structure. The channel member extends along an axis parallel to a longitudinal axis. A bow stop assembly is slidably mounted to the channel member. The bow stop assembly includes an elongated bow stop slidably received within a channel member. Means are provided for securing the bow stop within the channel member at a predetermined position.

In addition, the trailer includes first and second bunk elements extending parallel to the longitudinal axis. Each bunk element has a first end slidably mounted to the first cross frame member, and a second end slidably mounted to the second cross frame member such that the bunk elements are slidable in the direction transverse to the longitudinal axis. Means are provided for slidably mounting a first end of each bunk element to the first cross frame member and for securing the first end of the bunk elements to the frame structure. Similarly, means are provided for slidably mounting second end of each bunk element to the second cross frame member and for securing the second end of the bunk elements to the frame structure at a predetermined position.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

FIG. 3 is a cross-sectional view of the watercraft trailer taken along line 3—3 of FIG. 1;

FIG. 4 is a cross-sectional view of the watercraft trailer taken along line 4—4 of FIG. 3;

FIG. 5 is an isometric view showing a bunk element mounting structure for the watercraft trailer of the present invention;

FIG. 6 is an exploded isometric view of the bunk element mounting structure for the watercraft trailer of the present invention; and FIG. 7 is a cross-sectional view of the bunk element taken along line 7—7 of FIG. 5.

DETAILED DESCRIPTION OF THE PREFERRED EMBODIMENT

Figure 1:
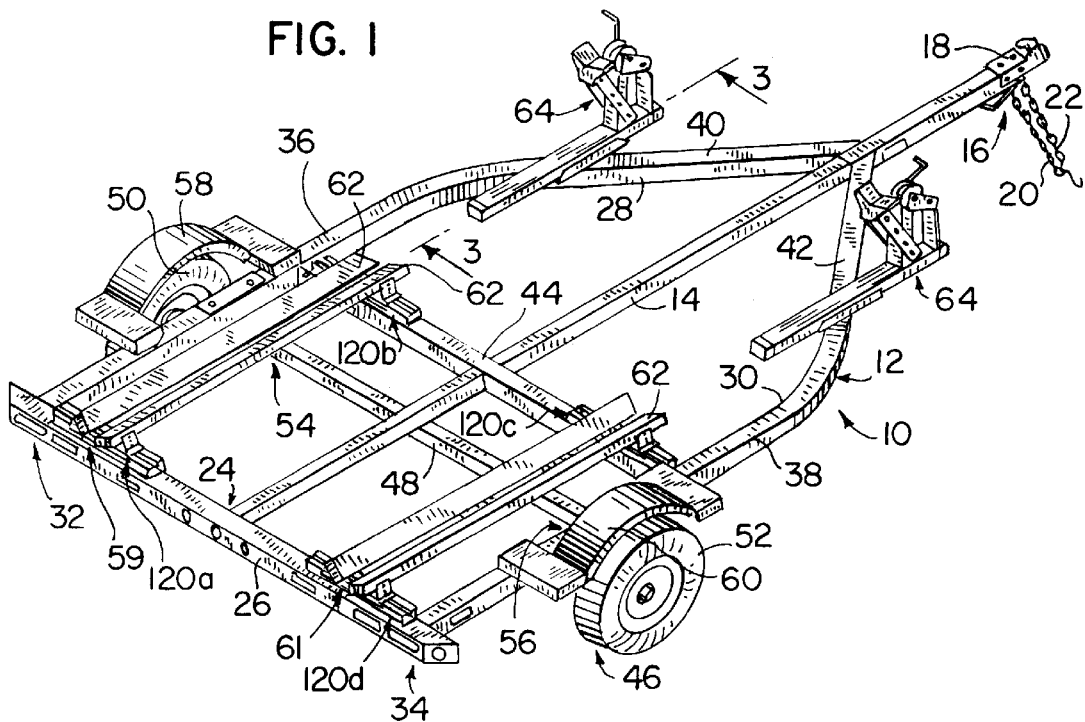
FIG. 1 is an isometric view of a watercraft trailer in accordance with the present invention.

Referring to FIG. 1, the trailer of the present invention is generally designated by the reference numeral 10. As shown in the drawings, the trailer 10 of the present invention is adapted for receipt of a pair of personal watercraft. Other configurations for trailer 10 such as a pontoon boat trailer, a boat trailer or the like are contemplated as being within the scope of the present invention. Trailer 10 includes a frame structure 12 which extends along a longitudinal axis. Frame structure 12 includes an elongated central frame member 14 which extends along the longitudinal axis. The elongated central frame member 14 has a first forward end 16 having a cup shaped receiver 18 mounted thereon for receiving a conventional ball attached to the rear of a towing vehicle. In addition, a pair of chains 20 and 22 extend from the forward end 16 of central frame member 14 in order to further secure trailer 10 to a tow vehicle.

Central frame member 14 includes a rearward end 24 which is joined to a first cross frame member 26 transverse to the longitudinal axis of trailer 10. First 28 and second 30 side frame members are joined to and extend from opposite sides of the central frame member 14 to opposite ends 32 and 34, respectively, of first cross frame member 26.

Each side frame member 28 and 30 includes a first straight side portion 36 and 38, respectively, which extends from a corresponding end 32 and 34 of first cross frame member 26. Straight side portions 36 and 38 are parallel to each other and to the longitudinal axis of trailer 10. Further, each side frame member 28 and 30 includes a second angled side portion 40 and 42, respectively, which interconnects its corresponding straight side portions 36 and 38, respectively, to central frame member 14. A second cross frame member 44 extends between straight side portion 36 of side frame member 28, and straight side portion 38 of side frame member 30 so as to interconnect side frame members 28 and 30 with the central frame member 14.

Trailer 10 is supported by a wheel and axle assembly 46. Wheel and axle assembly 46 includes a brace 48 having wheels 50 and 52 mounted to opposite ends 54 and 56, respectively, thereof. In addition, each end 54 and 56 of brace 48 is mounted to corresponding straight side portion 36 and 38, respectively, of side frame members 28 and 30, respectively. As seen in FIG. 1, each wheel 50 and 52 is covered by a fender 58 and 60, respectively, which in turn is mounted onto a corresponding straight side portion 36 and 38, respectively, of frame members 28 and 30.

As hereinafter described, first 59 and second 61 pairs of bunk elements 62 are slidably mounted between first 26 and second 44 cross frame members. All the bunk elements 62 are parallel to each other and to the longitudinal axis of trailer 10. In the preferred embodiment shown in the drawings, each pair 59 and 61 of bunk elements 62 define a bed for supporting a distinct, personal watercraft thereon.

In order to prevent the forward and rearward movement of a personal watercraft supported on the pairs of bunk elements 59 and 61 during transport of trailer 10, first and second bow stop assemblies 64 are provided. Each bow stop assembly 64 includes an elongated, hollow bow stop 66 having first and second end caps 68 and 70 placed over opposite ends thereof.

Figure 2:
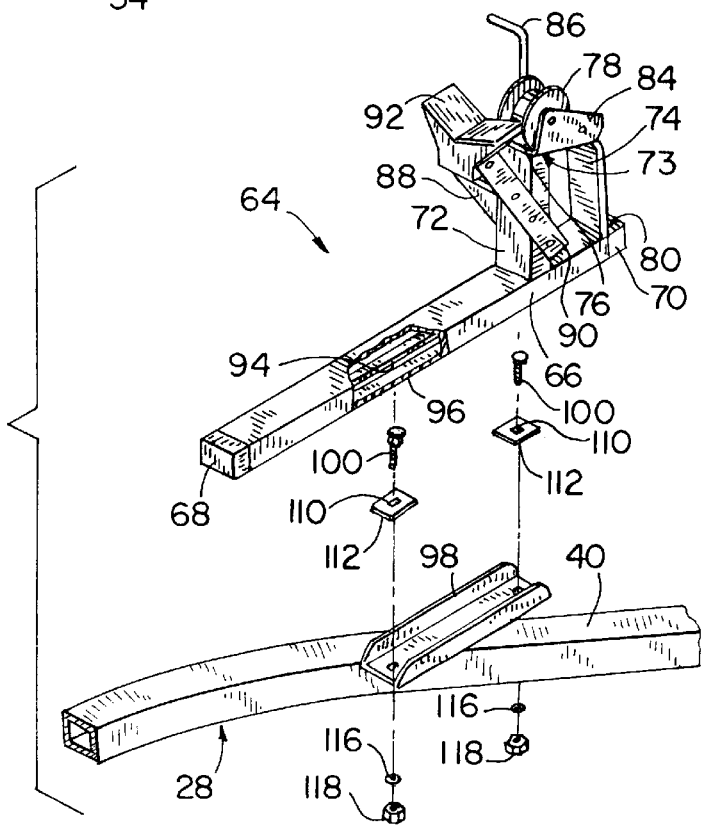
FIG. 2 is an exploded isometric view of a bow stop for the watercraft trailer of the present invention.

Referring to FIG. 2, bow stop assembly 64 further includes a winch stand 72 which projects vertically from bow stop 66, and supports a winch 78 thereon. A first end 73 of winch base plate 74 is secured to the upper surface 76 of winch stand 72, as by welding, to brace the winch 78 supported thereon. The second end 80 of winch base plate 74 is secured to bow stop 66, also preferably by welding.

Winch 78 is rotatably mounted between ears 84 of winch base plate 74 such that a winch strap may freely rotate on or off the winch 78 when loading or unloading a personal watercraft. Winch 78 may be of any type suitable for this purpose, as is known to those skilled in the art, whether the winch 78 is hand operated by means of a crank 86, as illustrated, or driven by a power assist.

First 88 and second 90 bow guard support brackets are mounted to opposite sides of winch stand 72. A bow guard 92 is pivotably mounted therebetween. As is conventional, bow guard 92 is adapted for engaging the forward end of a personal watercraft when such a watercraft is loaded on trailer 10, in order to prevent damage of the bow of the personal watercraft during transport on trailer 10.

In order to accommodate personal watercraft of various lengths, bow stop assembly 66 must be allowed to slide longitudinally along an axis parallel to the longitudinal axis of trailer 10. As such, bow stop 66 includes a slot 94 which extends longitudinally along its underside 96. As best seen in FIGS. 2–8, a generally U-shaped channel 98 is secured to each angled side portion 40 and 42 of frame structure 12. Each channel 98 extends along an axis parallel to the longitudinal axis of trailer 10 and is adapted for slidably receiving bow stop 66 therein.

Bow stop 66 is slidably mounted to channel 98 by first and second carriage bolts 100. Referring to FIG. 4, each carriage bolt 100 includes a head 102, a shaft 104, and a guide neck 106 therebetween. Each guide neck 106 of carriage bolt 100 has a generally square cross section, for reasons hereinafter described.

In order to slidably interconnect bow stops 66 to channel 98, carriage bolt 100 is positioned such that head 102 is received within the interior 108 of bow stop 66, FIGS. 3–4. Guide neck 106 extends through a corresponding square aperture 110 in washer 112, and partially into slot 94 formed in bow stop 66. As best seen in FIGS. 2–4, threaded shaft 104 of carriage bolt 100 extends through aperture 114 in channel 98. A washer 116 and nut 118 combination are threaded onto shaft 104 of carriage bolt 100 in order to maintain guide neck 106 partially in slot 94 formed in bow stop 66.

As shown in phantom in FIG. 3, bow stop 66 may be slid longitudinally within channel 98 such that guide neck 106 rides in slot 94. When bow stop 66 has been located in an operator selected position, nuts 118 are tightened, thereby retaining bow stop 66, and hence bow stop assembly 64, in the desired position. Square guide neck 106 in slot 94 prevents inadvertent rotation of carriage bolt 100 thereby insuring the bow stop 66 retains its position.

Similarly, in order to accommodate watercraft of different sizes, each pair 59 and 61 of bunk elements 62 is slidably mounted to cross frame members 26 and 44. Each pair of bunk elements 59 and 61 is movable along an axis transverse to the longitudinal axis of trailer 10 so as to accommodate the keels of different watercraft. Each pair of bunk elements 59 and 61 are mounted to first cross frame member 26 and to second cross frame member 44 by a bunk element connection assembly designated by the reference numerals 120a–d. Each bunk element connection assembly 120a–d and by way of example, bunk element connection assembly 120a of FIGS. 5–7 includes an elongated, hollow member 122 having a generally, rectangular cross-section. Each hollow member 122 is mounted to a distinct cross frame member 26 and 44, by way of example cross frame member 26, which is transverse to the longitudinal axis of trailer 10. A slot 124 extends longitudinally along the upper side 126 of each hollow member 122.

Each bunk element connection member assembly 120a–d further includes a connection member 128 having first 130 and second 132 bunk element support brackets which are mounted to the upper surface 134 of channel 136. Channel 136 is generally U-shaped and is adapted for receiving hollow member 122 therein between side walls 138 and 140.

Channel 136 is slidably mounted to hollow member 122 by a carriage bolt 142, FIG. 7. Carriage bolt 142 includes a head 144 and a shaft 146 with a guide neck 148 therebetween. Guide neck 148 of carriage bolt 142 has a generally square cross-section.

In order to slidably interconnect channel 136 to hollow member 122, carriage bolt 142 is positioned such that head 144 is received within the interior 150 of hollow member 122. Guide neck 148 extends through a corresponding square aperture 152 in washer 154 and partially into slot 124 formed in member 122. Threaded shaft 146 of carriage bolt 142 extends through an aperture 156 in channel 136. A washer 158 and nut 160 in combination are threaded onto shaft 146 of carriage bolt 142 in order to maintain guide neck 148 of carriage bolt 142 partially in slot 124 formed in member 122.

As described, each pair of bunk elements 59 and 61 may be slid along an axis transverse to the longitudinal axis of trailer 10 so as to accurately align the bunk elements 62 with the keel of the watercraft to be towed, by sliding each channel 136 with respect to its hollow member 122. When each pair of bunk elements 59 and 61 has been positioned in an operator desired position, each nut 160 is tightened onto corresponding threaded shaft 156 of carriage bolt 142, thereby retaining each channel 136 in a desired position along member 122, and hence retaining each pair of bunk elements 59 and 61 in their desired position.

Various modes of carrying out the invention are contemplated as being in the scope of the following claims, particularly pointing out and distinctly claiming the subject matter regarded as the invention.

We claim:

1. A trailer, comprising:

a frame structure extending along a longitudinal axis, the frame structure including first and second side portions and first and second pair of cross frame members transverse to the longitudinal axis interconnecting the side portions, each side portion having a first end which converges toward the first end of the other side portion, the frame structure other including a central frame member extending along the longitudinal axis, the central frame member having a first side joined to the first end of the first side portion of the frame structure, and a second, opposite side joined to the first end of the second side portion of the frame structure;

a wheel and axle assembly extending along a second axis transverse to the longitudinal axis, and mounted to the side portions of the frame structure;

a channel member mounted to the frame structure, the channel member extending along an axis parallel to the longitudinal axis;

a bow stop assembly slidably mounted to the channel member, the bow stop assembly including an elongated bow stop slidably received with channel member; and means for securing the bow stop within the channel member at a predetermined position.

2. The trailer of claim 1 wherein the central frame member has a first, forward end and a second rearward end joined to a cross frame member.

3. The trailer of claim 2 wherein the first, forward end of the central frame member includes a cup shaped receiving member to facilitate mounting the trailer on a tow vehicle.

4. The trailer of claim 1 wherein each side portion of the frame structure includes a straight side portion, the straight side portion joined to the pair of cross frame members.

5. The trailer of claim 4 wherein the wheel and axle assembly includes first and second wheels rotatably mounted to a brace, each wheel rotatable about the second axis.

6. The trailer of claim 5 wherein the brace of the wheel and axle assembly has a first end joined to the straight side portion of one side portion of the frame structure, and a second end joined to the straight side portion of the other side portion of the frame structure.

7. The trailer of claim 5 wherein each side portion includes a fender mounted thereto, each fender radially spaced and extending circumferentially partially about the second axis.

8. The trailer of claim 1 wherein the bow stop assembly includes a winch stand projecting from a first upper surface of the bow stop, the winch stand supporting a winch.

9. A trailer, comprising:

a frame structure extending along a longitudinal axis, the frame structure including first and second side portion and first and second pair of cross frame members transverse to the longitudinal axis interconnecting the side portions, each side portion having a first end which converges toward the first end of the other side portion;

a wheel and axle assembly extending along a second axis transverse to the longitudinal axis, and mounted to the side portions of the frame structure;

a channel member mounted to the frame structure, the channel member extending along an axis; parallel to the longitudinal axis;

a bow stop assembly slidably mounted to the channel member, the bow stop assembly including an elongated, generally hollow stop slidably received within channel member, the bow stop including a first upper surface directed away from the channel member and a second lower surface having an elongated slot therein; and securement structure for securing the bow stop within the channel member at a predetermined position.

10. The trailer of claim 9, wherein the channel member is generally U-shaped and includes first and second parallel, spaced vertical sidewalls projecting from opposite sides of a flat, elongated base.

11. The trailer of claim 10 wherein the channel member includes an aperture projecting through the elongated base, the aperture being in alignment with the elongated slot on the lower surface of the bow stop, when the bow stop is slidably received within the channel member.

12. The trailer of claim 11 wherein the means for securing the bow stop within the channel includes a carriage-bolt, the carriage bolt having a head received within the hollow interior of the bow stop, a neck project partially into the elongated slot in the bow stop, and a threaded shaft projecting through the aperture in the channel member.

13. The trailer of claim 12 wherein the means for securing the bow stop within the channel further includes a nut adapted for receipt on the threaded shaft of the carriage bolt, the nut threadable on the threaded shaft between a first position wherein the bow stop is slidable in the channel member in a direction parallel to the longitudinal axis, and a second position wherein a portion of the elongated base of the channel member and a portion of lower surface of the bow stop are captured between the head of the carriage bolt and the nut such that the bow stop is retained with respect to the channel member at a predetermined position.

14. A trailer, comprising:

a frame structure extending along a longitudinal axis, the frame structure including first and second side portions and first and second pair of cross frame members transverse to the longitudinal axis interconnecting the side portions, each side portion having a first end which converges toward the first end of the other side portion;

a wheel and axle assembly extending along a second axis transverse to the longitudinal axis, and mounted to the side portions of the frame structure;

a channel member mounted to the frame structure, the channel member extending along an axis parallel to the longitudinal axis;

a bow stop assembly slidably mounted to the channel member, the bow stop assembly including an elongated bow stop slidably received within channel member;

securement structure for securing the bow stop within the channel member at a predetermined position;

first and second elongated bunk elements extending parallel to the longitudinal axis, each bunk element having a first end slidably mounted to the first cross frame member, and a second end slidably mounted to the second cross frame member such that the bunk elements are slidable in the direction transverse to the longitudinal axis; and mounting structure for slidably mounting the first end of each bunk element to the flat cross frame member, the mounting structure including a generally rectangular, hollow member, the hollow member including a first lower surface extending along and secured to the flat cross frame member, and a second, opposite upper surface having an elongated slot therein.

15. The trailer of claim 14 wherein mounting structure for slidably mounting the first end of each bunk element to the first cross frame member further includes a generally U-shaped channel member, the channel member including first and second parallel, spaced vertical sidewalls for receiving the hollow member therebetween, the vertical sidewalls projecting from opposite sides of a flat, elongated base.

16. The trailer of claim 15 wherein the channel member includes first and second bunk element support brackets projecting therefrom, each bunk element support bracket adapted for receiving the first end of a distinct bunk element.

17. The trailer of claim 16 wherein the channel member includes an aperture projecting through the elongated base, the aperture being aligned with the elongated slot on the upper surface of the hollow member, when the hollow member is slidably received within the channel member.

18. The trailer of claim 17 further comprising a securement structure for securing the first end of the bunk elements to the frame structure at a predetermined position.

19. The trailer of claim 18 wherein the securement structure for securing the first end of the bunk elements to the frame structure includes a carriage bolt, the carriage bolt having a head received within the interior of the hollow member, a neck projecting partially into the slot in the hollow member, and a threaded shaft projecting through the aperture of the channel member.

20. The trailer of claim 19 wherein the securement structure for securing the first end of the bunk elements to the frame structure includes a nut adapted for receipt on the threaded shaft of the carriage bolt, the nut threadable on the threaded shaft between a first position wherein the first ends of the bunk elements are slidable along the first cross frame member in a direction transverse to the longitudinal axis, and the second position wherein a portion of the elongated base of the channel member and a portion of the upper surface of the hollow member are captured between the head of the carriage bolt and the nut such that the first end of each bunk element is retained in a predetermined position along the first cross frame member.

21. The trailer of claim 20 further comprising mounting structure for slidably mounting the second end of each bunk element to the second cross frame member.

22. At The trailer of claim 21 wherein the mounting structure for slidably mounting the second end of each bunk element to the second cross frame member includes a generally rectangular, hollow member, the hollow member including a first lower surface extending along and secured to the second cross frame member, and a second, opposite upper surface having an elongated slot therein.

23. The trailer of claim 22 wherein the mounting structure for slidably mounting the second end of each bunk element to the second cross frame member further includes a second generally U-shaped channel member, the second channel member including first and second parallel, spaced vertical side walls for receiving the second hollow member therebetween, the vertical side walls projecting from opposite sides of the flat, elongated base.

24. The trailer of claim 23 wherein the second channel member includes first and second bunk elements support brackets projecting therefrom, each bunk element support bracket projecting from the second channel member being adapted for receiving the second end of the distinct bunk element.

25. The trailer of claim 24 wherein the second channel member includes an aperture projecting through the elongated base, the aperture being aligned with the elongated spot on the upper surface of the second hollow member, when the second hollow member is slidably received within the channel member.

26. The trailer member of claim 25 further comprising a securement structure for securing the second end of the bunk elements to the frame structure at a predetermined position.

27. The trailer of claim 26 wherein the securement structure for securing the second end of the bunk elements to the frame structure includes a second carriage bolt, the second carriage bolt having a head received within the interior of the second hollow member, a neck projecting partially into the slot in the second hollow member, and a threaded shaft projecting through the aperture in the second channel member.

28. The trailer of claim 27 wherein the securement structure for securing the second end of the bunk elements to the frame structure includes a second nut adapted for receipt on a threaded shaft with the second carriage bolt, the second nut threadable on the threaded shaft of the second carriage bolt between a first position wherein the second ends of the bolt elements are slidable along a second cross frame member in a direction transverse to the longitudinal axis, and a second position wherein a portion of the elongated base of the second channel member and a portion of the upper surface of the second hollow member are captured between the head and second carriage bolt and the second nut such that the second end of each bunk element is retained in a predetermined position along the second cross frame member.

29. A trailer, comprising:
   a frame structure extending along the longitudinal axis, the frame structure including first and second side portions, and first and second cross frame members transverse to the longitudinal axis and interconnecting the side portion, each side portion having a first end coverges towards the first end of the other side portion;
   a wheel and axle assembly extending along a second axis transverse to the longitudinal axis and mounted to the side portions of the frame structure;
   first and second elongated bunk elements extending parallel to the longitudinal axis, each bunk element has a first end slidably mounted to the first cross frame member, and a second end slidably mounted to the second cross member such that the elements are slidable in a direction transverse to the longitudinal axis; and
   a mounting structure for slidably mounting a first end of each bunk element to the cross frame member, the mounting structure including a generally rectangular, hollow member, the hollow member including a first lower surface extending along and secured to the first cross frame member and a second, opposite upper surface having an elongated slot therein.

30. The trailer of claim 29 wherein the mounting structure for slidably mounting the first end of each bunk element to the first cross frame member further includes a generally U-shaped channel member, the channel member including first and second parallel, spaced vertical sidewalls for receiving the hollow member therebetween, the vertical sidewalls projecting from opposite sides of a flat, elongated base.

31. The trailer of claim 30 wherein the channel member includes first and second bunk element support brackets projecting therefrom, each bunk element support bracket adapted for receiving the first end of a distinct bunk element.

32. The trailer of claim 31 wherein the channel member includes an aperture projecting through the elongated base, the aperture being aligned with the elongated slot on the upper surface of the hollow member, when the hollow member is slidably received within the channel member.

33. The trailer of claim 32 further comprising a securement structure for securing the first end of the bunk elements to the frame structure at a predetermined position.

34. The trailer of claim 33 wherein the securement structure for securing the first end of the bunk elements to the frame structure includes a carriage bolt, the carriage bolt having a head received within the interior of the hollow member, a neck projecting partially into the slot in the hollow member, and a threaded shaft projecting through the aperture of the channel member.

35. The trailer of claim 34 wherein the securement structure for securing the first end of the bunk elements to the frame structure includes a nut adapted for receipt on the threaded shaft of the carriage bolt, the nut threadable on the threaded shaft between a first position wherein the first ends of the bunk elements are slidable along the first cross frame member in a direction transverse to the longitudinal axis, and the second position wherein a portion of the elongated base of the channel member and a portion of the upper surface of the hollow member are captured between the head of the carriage bolt and the nut such that the first end of each bunk element is retained in a predetermined position along the first cross frame member.

36. The trailer of claim 35 further comprising mounting structure for slidably mounting the second end of each bunk element to the second cross frame member.

37. The trailer of claim 36 wherein the mounting structure for slidably mounting the second end of each bunk element to the second cross frame member includes a generally rectangular, hollow member, the hollow member including a first lower surface extending along and secured to the second cross frame member, and a second, opposite upper surface having an elongated slot therein.

38. The trailer of claim 37 wherein the mounting structure for slidably mounting the second end of each bunk element to the second cross frame member further includes a second generally U-shaped channel member, the second channel member including first and second parallel, spaced vertical side walls for receiving the second hollow member therebetween, the vertical side walls projecting from opposite sides of the flat, elongated base.

39. The trailer of 38 wherein the second channel member includes first and second bunk elements support brackets projecting therefrom, each bunk element support bracket projecting from the second channel member being adapted for receiving the second end of the distinct bunk element.

40. The trailer of claim 39 wherein the second channel member includes an aperture projecting through the elongated base, the aperture being aligned with the elongated spot on the upper surface of the second hollow member, when the second hollow member is slidably received within the channel member.

41. The trailer member of claim 40 further comprising a securement structure for securing the second end of the bunk elements to the frame structure at a predetermined position.

42. The trailer of claim 41 wherein the securement structure for securing the second end of the bunk elements to the frame structure includes a second carriage bolt, the second carriage bolt having a head received within the interior of the second hollow member, a neck projecting partially into the slot in the second hollow member, and a threaded shaft projecting through the aperture in the second channel member.

43. The trailer of claim 42 wherein the securement structure for securing the second end of the bunk elements to the frame structure includes a second nut adapted for receipt on a threaded shaft with the second carriage bolt, the second nut threadable on the threaded shaft of the second carriage bolt between a first position wherein the second ends of the bolt elements are slidable along a second cross frame member in a direction transverse to the longitudinal axis, and a second position wherein a portion of the elongated base of the second channel member and a portion of the upper surface of the second hollow member are captured between the head and second carriage bolt and the second nut such that the second end of each bunk element is retained in a predetermined position along the second cross frame member.

* * * * *

UNITED STATES PATENT AND TRADEMARK OFFICE
CERTIFICATE OF CORRECTION

PATENT NO. : 5,823,559
DATED : Oct. 20, 1998
INVENTOR(S) : Tony P. Priesgen, Gary L. Youmans It is certified that error appears in the above-identified patent and that said Letters Patent is hereby corrected as shown below:

In column 5, line 13, delete "other" and insert --further--.
In column 8, line 47 after "member" insert a --,--.

Signed and Sealed this

Fourth Day of May, 1999

Attest:

Attesting Officer

Q. TODD DICKINSON

Acting Commissioner of Patents and Trademarks